(12) United States Patent
Lee et al.

(10) Patent No.: US 9,902,568 B2
(45) Date of Patent: Feb. 27, 2018

(54) CONVEYANCE APPARATUS INCLUDING VARIABLE JIG AND DRIVING METHOD THEREOF

(71) Applicant: ELECTRONICS AND TELECOMMUNICATIONS RESEARCH INSTITUTE, Daejeon (KR)

(72) Inventors: Yong Kwi Lee, Daejeon (KR); Hyun Jong Kim, Cheongju-si (KR); Jun Hee Park, Daejeon (KR); Young Ae Jeon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/387,827

(22) Filed: Dec. 22, 2016

(65) Prior Publication Data

US 2017/0210570 A1 Jul. 27, 2017

(30) Foreign Application Priority Data

Jan. 27, 2016 (KR) .................. 10-2016-0010263

(51) Int. Cl.
*B65G 47/88* (2006.01)
*B65G 43/08* (2006.01)
(Continued)

(52) U.S. Cl.
CPC ......... *B65G 47/8815* (2013.01); *B65G 43/00* (2013.01); *B65G 43/08* (2013.01);
(Continued)

(58) Field of Classification Search
CPC ........ B65G 43/00; B65G 43/08; B65G 47/29; B65G 47/295; B65G 47/8815;
(Continued)

(56) References Cited

U.S. PATENT DOCUMENTS 5,688,013 A * 11/1997 Sehrt ................. B25J 15/106
294/86.4
5,957,517 A * 9/1999 Chen ................. B25J 15/106
294/86.4
(Continued)

FOREIGN PATENT DOCUMENTS

KR 10-2012-0051108 A 5/2012
KR 20-2012-0006426 U 9/2012
KR 10-1209802 B1 12/2012

*Primary Examiner* — Leslie A Nicholson, III
*Assistant Examiner* — Keith R Campbell
(74) *Attorney, Agent, or Firm* — LRK Patent Law Firm

(57) ABSTRACT

A conveyance apparatus including a variable jig and a driving method thereof. The conveyance apparatus includes a transport unit including a transfer belt extending from a loading position to an unloading position of works, the transport unit being a movement path for the works, a variable jig module disposed with respect to a position, where the works stop, in the movement path to support the works, the variable jig module being a variable jig that varies a supporting base, based on shapes of the works, a sensing unit disposed outside the transfer belt with respect to the variable jig module to measure a movement or position of the works, an image processing unit configured to perform image processing on the works transported through the transfer belt, and a controller electrically connected to the variable jig module to control an operation of the variable jig module.

11 Claims, 12 Drawing Sheets

(51) Int. Cl.
*B65G 47/29* (2006.01)
*B65G 43/00* (2006.01)

(52) U.S. Cl.
CPC ....... *B65G 47/295* (2013.01); *B65G 47/8869* (2013.01); *B65G 2203/041* (2013.01); *B65G 2205/02* (2013.01); *B65G 2205/06* (2013.01); *B65G 2207/08* (2013.01)

(58) Field of Classification Search
CPC .......... B65G 47/8869; B65G 2203/041; B65G 2203/044; B65G 2205/02; B65G 2205/06; B65G 2207/08; B65G 47/8876; B65G 47/8884; B65G 47/8892
See application file for complete search history.

(56) References Cited

U.S. PATENT DOCUMENTS

| | | | | |
|---|---|---|---|---|
| 6,019,211 A * | 2/2000 | Masciarelli, Jr. | .... | B65G 13/065 193/35 MD |
| 6,443,292 B1 * | 9/2002 | Grund | ................. | B65G 47/244 198/444 |
| 6,591,962 B2 * | 7/2003 | Miyake | ............. | B65G 47/5181 198/347.1 |
| 7,188,721 B1 * | 3/2007 | Wu | ...................... | B65G 47/244 193/35 MD |
| 7,497,317 B2 * | 3/2009 | Chang | ................... | B65G 47/29 198/347.1 |
| 9,010,524 B2 * | 4/2015 | Dorr | ..................... | B65G 47/22 193/35 A |
| 2005/0139450 A1 * | 6/2005 | Behnke | ............. | B65G 47/8815 198/459.1 |
| 2006/0121147 A1 | 6/2006 | Ryu et al. | | |
| 2009/0000917 A1 * | 1/2009 | Busch | ................. | B65G 47/244 198/617 |
| 2013/0193983 A1 | 8/2013 | Yeo | | |
| 2017/0029219 A1 * | 2/2017 | Bindelli | ................ | B28D 7/046 |

* cited by examiner

CONVEYANCE APPARATUS INCLUDING VARIABLE JIG AND DRIVING METHOD THEREOF

CROSS-REFERENCE TO RELATED APPLICATION(S)

This application claims priority under 35 U.S.C. § 119 to Korean Patent Application No. 10-2016-0010263, filed Jan. 27, 2016, the disclosure of which is incorporated herein by reference in its entirety.

BACKGROUND OF THE INVENTION

1. Field of the Invention

The present invention relates to a conveyance apparatus including a variable jig and a driving method thereof, and more particularly, to a conveyance apparatus including a variable jig and a driving method thereof, which fix and support works in a factory or convey works before and after work.

2. Description of Related Art

Generally, in an assembly work at a factory, manufacturing products or works are mounted on a jig, and a conveyance apparatus conveys the jig and the works. Here, the jig is individually manufactured based on shapes of works. That is, the jig is manufactured based on the standards, shapes, and types of works, for a number of assembly work processes at a factory.

The jig may be a fixing device or a fixing structure which fixes works, supports the works when assembling components with the works, and helps movement of the works.

An assembly work process associated with works needs a number of jigs. The kind and number of jigs may increase based on the product specification or an assembly process associated with works. For example, the number of jigs may be one to hundreds, for producing one product.

The jigs are used until corresponding products or works are produced and are discontinued.

The jigs are manufactured through a mold or are manufactured through a mechanical process or assembly.

The manufacturing cost of the jigs is very expensive. For example, if it is impossible to reuse and recycle a jig used in each process or production line, it is difficult to lower the price of products.

For example, works requiring a jig may be door trims of vehicle doors.

The door trims may each be an assembly where a lower trim and a map pocket are assembled with each other. The assembly is conveyed to an assembly position with being mounted on a jig. A worker or an assembly device at a work position of a factory performs an assembly operation of assembling components, such as various switches, a side mirror direction control button, and/or the like, with an assembly. The assembly operation ends, and then, an assembly and a jig are moved to a position where a next assembly process is performed.

In terms of the usability or characteristic of jigs, it is difficult to reuse or recycle the jigs for a target instead of specific works. Also, it is very difficult to modify the jigs for works based on another standard. For example, if the product standard is changed, an assembly line should perform mixed flow production. Also, since product production is changed, a jig for the changed product production should also be replaced.

An assembly line is stopped while a jig is being replaced with another jig. In factories where production per hour is importantly considered, enormous losses occur.

SUMMARY

Accordingly, the present invention provides a conveyance apparatus including a variable jig and a driving method thereof, in which by using a transport unit which is disposed along a process line to convey works and a variable jig module which is disposed at a position where a conveyor belt of the transport unit stops and varies based on shapes of the works, the variable jig module may be modified and reconfigured based on the shapes of the works, and thus, a problem of cost expended in an assembly process is solved, production is performed without needing a jig replacement time or the replacement cost, and jigs used at a factory are used in common.

In one general aspect, a conveyance apparatus including a variable jig includes: a transport unit including a transfer belt extending from a loading position to an unloading position of works, the transport unit being a movement path for the works; a variable jig module disposed with respect to a position, where the works stop, in the movement path to support the works, the variable jig module being a variable jig that varies a supporting base, based on shapes of the works; a sensing unit disposed outside the transfer belt with respect to the variable jig module to measure a movement or position of the works; an image processing unit configured to perform image processing on the works transported through the transfer belt; and a controller electrically connected to the variable jig module to control an operation of the variable jig module.

The transport unit may further include a belt driving device configured to move the transfer belt through the movement path, and a plurality of belt through holes, through which a plurality of support pin parts provided in the variable jig module pass, may be provided in the transfer belt.

The variable jig module may be disposed apart from a bottom of the transfer belt.

The variable jig module may be installed on a bottom or a top of the transfer belt.

The variable jig module may include: a casing including a plurality of pin entrances respectively communicating with the plurality of belt through holes, the plurality of pin entrances being provided in a top of the casing; the plurality of support pin parts installed inside the casing and disposed to respectively correspond to the plurality of pin entrances; an extension shaft member extending in a lengthwise direction of each of the plurality of support pin parts from a lower portion of a corresponding support pin part, a rack gear being provided in each of both side surfaces of the extension shaft member; a pinion gear engaging with the rack gear, the pinion gear being rotatably supported to the casing; and a driving device including a motor, configured to operate according to a motor control signal of the controller, and a shafting configured to deliver a driving force of the motor to the pinion gear, and the driving device may deliver the driving force for raising or lowering the plurality of support pin parts to the pinion gear according to the motor control signal of the controller.

The plurality of support pin parts may each include: a pressure sensor installed in an upper end of the extension shaft member to input a pressure measurement signal, generated based on a contact with the works, to the controller; a hollow body coupled to the extension shaft member to surround the pressure sensor, the hollow body extending to each of the plurality of pin entrances and including an upper hole having a hole size which is relatively smaller than a flat area of the pressure sensor; an elastic member located on a top of the pressure sensor and disposed inside the hollow body; and a roller ball disposed on the elastic member and restrained by a border of the upper hole of the hollow body.

The variable jig module may further include a pin brake device disposed close to the pinion gear to lock or release the pinion gear.

The pin brake device may include: a stop gear provided in a ratchet shape to engage with the pinion gear; and an actuator coupled to a rotation shaft of the stop gear to rotate or reversely rotate the stop gear according to a locking or releasing signal of the controller to bring the stop gear in contact with the pinion gear or separate the stop gear from the pinon gear.

The controller may include: a micro-computer unit configured to receive a sensing signal of the sensing unit corresponding to the presence of loading or unloading of the works, an image processing signal delivered from the image processing unit, and a pressure measurement signal of the pressure sensor to control the motor; a programmable logic controller connected to the micro-computer unit to control movement or stop of the transfer belt of the transport unit in cooperation with the micro-computer unit, based on a process for the works; a project planning controller connected to the programmable logic controller to plan and control a project associated with the process for the works and display an operation command or an operation situation of the transport unit or the variable jig module to a user; and a manufacturing execution system connected to the programmable logic controller to manage a signal or information processed by the programmable logic controller.

In another general aspect, a driving method of a conveyance apparatus, including a variable jig and a controller coupled to a transport unit transporting works to vary a supporting base based on shapes of the works, includes: by the controller, moving or stopping a transfer belt of the transport unit to allow the works to be located on a variable jig module; when the transfer belt stops, controlling an operation of a motor of the variable jig module to raise a plurality of support pin parts with a driving force of the motor, and when a roller ball of each of the plurality of support pin parts contacts a bottom of each of the works, comparing a threshold value with a value of a pressure measurement signal input from a pressure sensor of each of the plurality of support pin parts to stop the raising of the plurality of support pin parts; photographing the works on the variable jig module by using an image processing unit to generate image information, and matching-comparing a position of the works on the variable jig module with a position included in a design drawing by using previously prepared design drawing information about the works and the image information; and displaying a result of the matching comparison on a human machine interface of a project planning controller.

The displaying may include, by the controller, starting a process on the works according to information displayed on the human machine interface, lowering the plurality of support pin parts according to a process completion button click signal which is input to the controller when the process on the works is completed, and moving the transfer belt, thereby performing control to transport the works to a next process.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Hereinafter, embodiments of the present invention will be described in detail with reference to the accompanying drawings.

A variable jig may denote a variable jig module to be described below. A conveyance apparatus may denote a whole apparatus where the variable jig module is included in a conventional conveyor belt, a conventional transfer device, and a conventional line type transport device.

Figure 1:
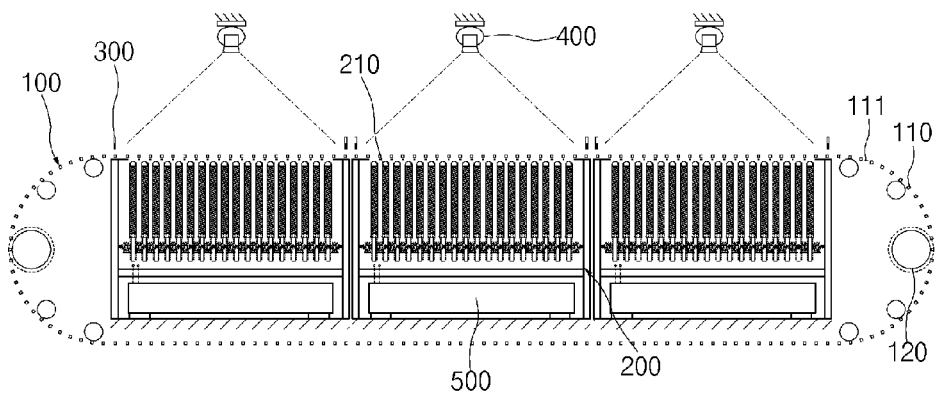
FIG. 1 is a front view of a conveyance apparatus including a variable jig according to an embodiment of the present invention.
Figure 2:
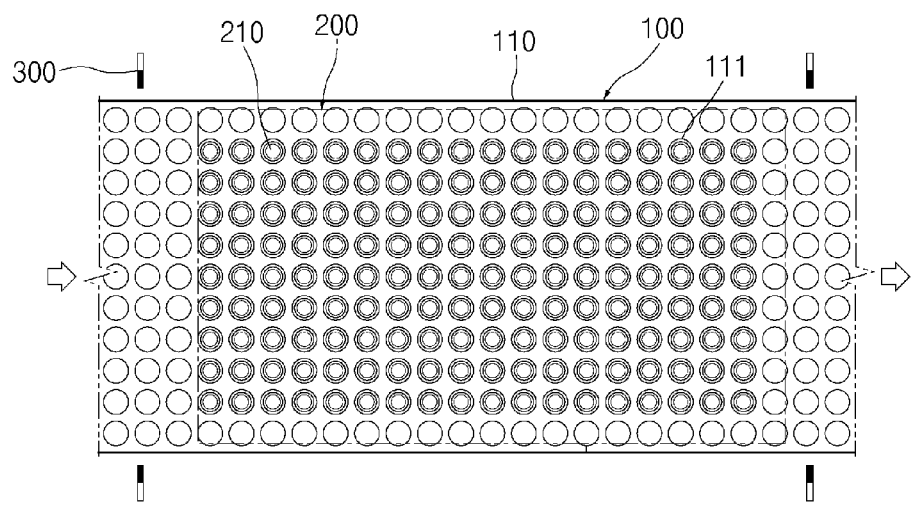
FIG. 2 is a plan view of the conveyance apparatus including the variable jig illustrated in FIG. 1.
Figure 3:
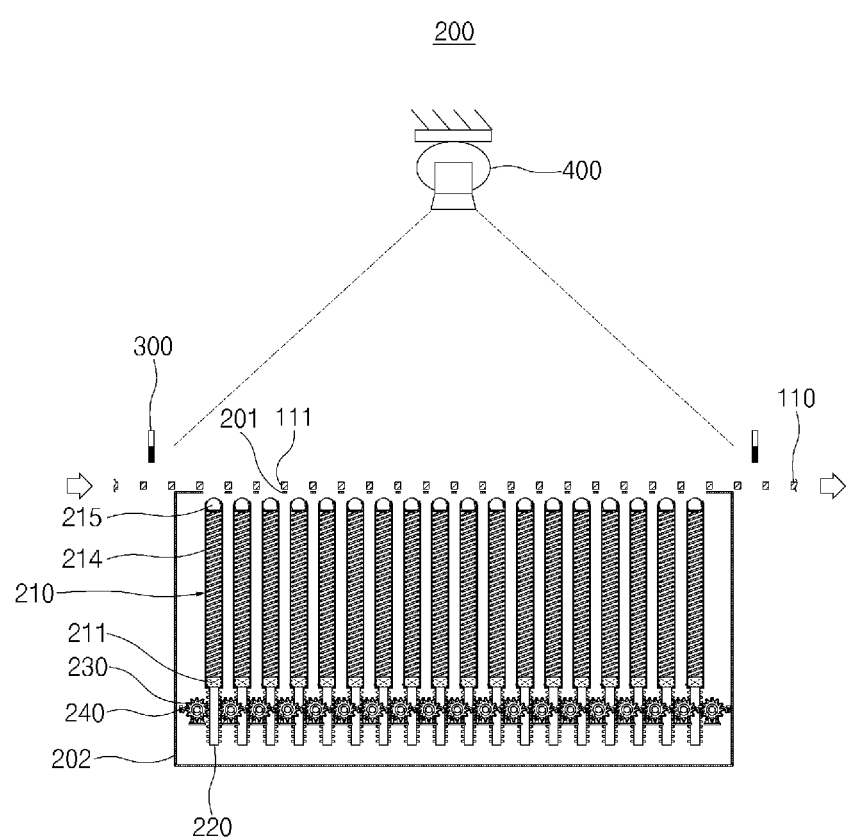
FIG. 3 is a front view illustrating the enlarged inside of a variable jig module illustrated in FIG. 1.
Figure 4:
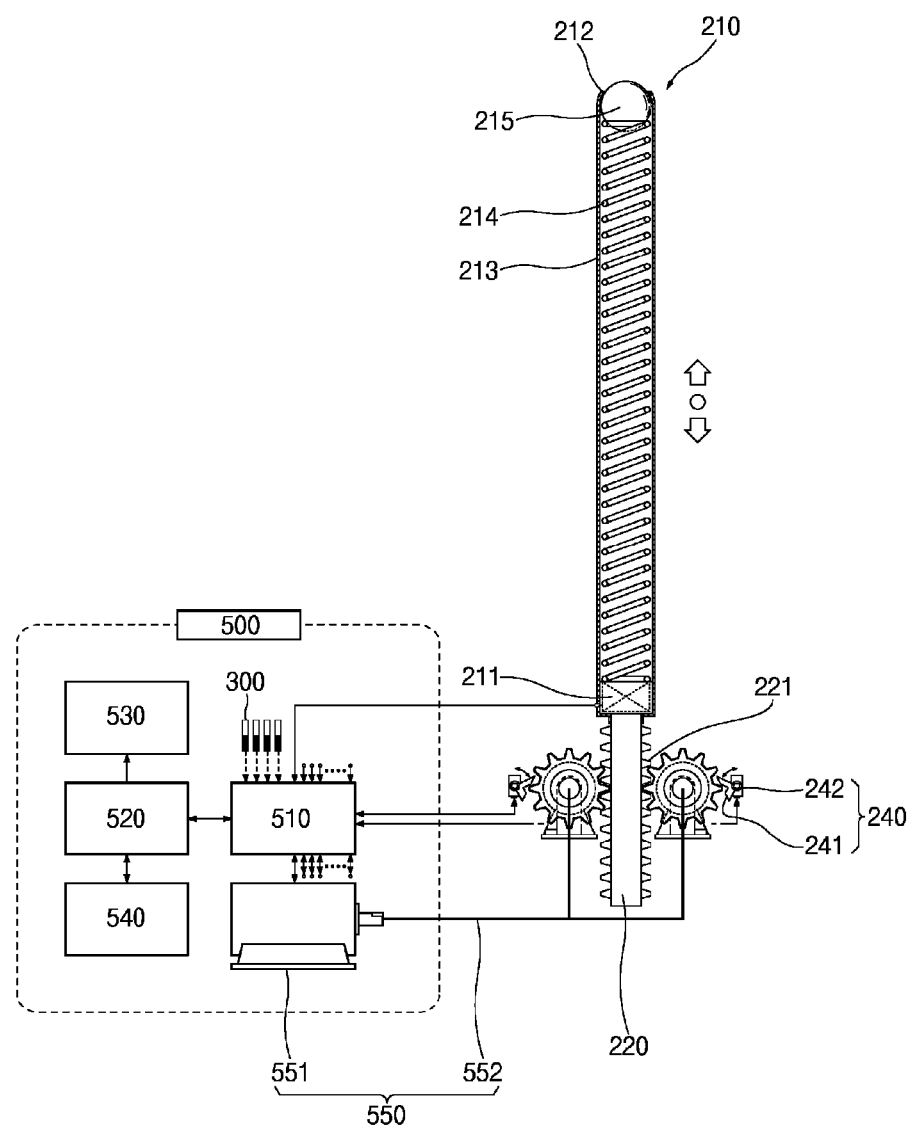
FIG. 4 is a diagram for describing a support pin part and a controller of the variable jig module illustrated in FIG. 3.

FIG. 1 is a front view of a conveyance apparatus including a variable jig according to an embodiment of the present invention. FIG. 2 is a plan view of the conveyance apparatus including the variable jig illustrated in FIG. 1. FIG. 3 is a front view illustrating the enlarged inside of a variable jig module illustrated in FIG. 1. FIG. 4 is a diagram for describing a support pin part and a controller of the variable jig module illustrated in FIG. 3.

Referring to FIG. 1 or 2, the conveyance apparatus according to the present embodiment may include a transport unit 100, one or more variable jig modules 200, a sensing unit 300, an image processing unit 400, and a controller 500.

The transport unit 100 may be a conveyance means such as a conveyor belt may include a transfer belt 110 which extends from a loading position to an unloading position of works which are to be transferred or conveyed. The transport unit 100 may correspond to a moving path for the works.

The transport unit 100 may further include a belt driving device 120. The belt driving device 120 may include a conveyor driving motor, which operates elements (for example, a driving roller, a driven roller, and a conveyor driving motor driving the driving roller) for moving the transfer belt 110 through a movement path, and a guide roller that prevents the abnormal driving of the transfer belt 110 and guides a movement of the transfer belt 110.

Particularly, a plurality of belt through holes 111 through which a plurality of support pin parts 210 provided in the variable jig module 200 pass may be provided in the transfer belt 110.

The variable jig module 200 may be provided as at least one (for example, three). The variable jig module 200 may be disposed under and spaced apart from a bottom of the transfer belt 110, and the at least one variable jig module 200 may be arranged along the movement path.

A position of the variable jig module 200 may be a position where the transfer belt 110 stops, or may be a position where a process (for example, an assembly process or a component coupling process of coupling elements of a door trim) for actual works is performed.

The transfer belt 110 may include the movement path for the variable jig module 200.

An upper left side of the movement path through which the transfer belt 110 passes may be a works inlet. Here, the works inlet may denote a portion through which works located on the transfer belt 110 are loaded in.

An upper right side of the movement path through which the transfer belt 110 passes may be a works outlet. Here, the works outlet may denote a portion through which the works located on the transfer belt 110 are unloaded out.

The variable jig module 200 may be disposed on the movement path of the transfer belt 110. In this case, a disposition reference of the variable jig module 200 may be a position where works stop.

The variable jig module 200 may be a variable jig that varies a supporting base of works, based on shapes of the works and supports the works.

The sensing unit 300 may be disposed outside the transfer belt 110 with respect to the variable jig module 200. The sensing unit 300 may measure the movement or position of works. The sensing unit 300 may include a plurality of infrared sensors. The sensing unit 300 may be disposed at each of the works inlet and the works outlet along a direction of the movement path, or may be disposed with respect to a direction vertical to the direction of the movement path.

The image processing unit 400 may be installed in the variable jig module 200 and a holder (not shown) in an upper space of the transfer belt 110 corresponding thereto. The image processing unit 400 may be a generic name for a camera and an image processing system connected to the camera. The image processing unit 400 may be configured to perform image processing on the works transported through the transfer belt 110. The image processing unit 400 may input an image processing signal or data, corresponding to a result of the image processing, to the controller 500. The camera for the image processing unit 400 may be installed in the holder in the upper space with respect to a center position of the variable jig module 200. The camera for the image processing unit 400 may photograph works.

The variable jig module 200 may be provided in plurality, and the controller 500 may be included in each of the plurality of variable jig modules 200. Alternatively, the controller 500 may be configured to integratedly manage the plurality of variable jig modules 200.

The controller 500 may be electrically connected to the variable jig module 200. The controller 500 may control an operation of the variable jig module 200. A detailed control operation of the controller 500 for an operation of the variable jig module 200 will be described below in detail.

When a factory line operates at a factory, the transfer belt 110 may start to move, and production preparation for works which are products to be produced at the factory may be made.

The transfer belt 110 may include the plurality of belt through holes 111. The belt through holes 111, as described above, may be provided in the transfer belt 110 by the number or more of the support pin parts 210 of the variable jig module 200 disposed under the transfer belt 110.

Each of the belt through holes 111, as described below, may have a size smaller than a size which enables each of the support pin parts 210 to enter a corresponding belt through hole.

An input of works may be directed by a worker of a process for the works.

The sensing unit 300 such as the above-described infrared sensor may be installed in the works inlet or the works outlet.

A signal value sensed by each of the infrared sensors of the sensing unit 300 may be an analog signal or a sensing signal. For example, the sensing signal may be a sensing signal of the sensing unit 300.

The sensing signal may be input to a micro-computer unit (MCU) 510 of the controller 500 illustrated in FIG. 4.

The MCU 510 of the controller 500 may be configured to receive the sensing signal of each infrared sensor to determine, by using a digital converter (not shown), whether a signal is generated.

Referring to FIG. 1 or 4, the MCU 510 of the controller 500 may receive the sensing signal of the sensing unit 300 corresponding to the presence of loading or unloading of works, the image processing signal transferred from the image processing unit 400, and a pressure measurement signal of a pressure sensor mounted on each of the support pin parts 210 of the variable jig module 200.

The MCU 510 may control a motor 551 by using the sensing signal, the image processing signal, and the pressure measurement signal. The motor 551 may generate a driving force necessary for raising or lowering each of the support pin parts 210 in the variable jig module 200.

The controller 500 may include a programmable logic controller (PLC) 520, a project planning controller (PPC) 530, and a manufacturing execution system (MES) 540.

Here, the PLC 520 may be connected to the MCU 510 and may cooperate with the MCU 510. The PLC 520 may control the movement or stop of the transfer belt 110 of the transport unit 100, based on a process for works.

The PPC 530 may be connected to the PLC 520. The PPC 530 may plan and control a project associated with a process for works. The PPC 530 may display an operation command or an operation situation of the transport unit 100 or the variable jig module 200 to a user. For example, in order to display a matching comparison result of a below-described image processing operation, the PPC 530 may further include a human machine interface (HMI) (not shown).

The MES 540 may be a system that overall collects, analyzes, manages, and controls all information, obtained from a manufacturing site, such as production plan, raw materials input, production, quality and yield management, facilities operation management, etc. For example, the MES 540 may be connected to the PLC 520. The MES 540 may manage or display a signal or information processed by the PLC 520.

A sensing signal corresponding to loading of works may be generated by the infrared sensor of the sensing unit 300 disposed in the works inlet.

The controller 500 may operate the transfer belt 110 until the sensing signal is input from the infrared sensor, disposed in the works outlet, of the sensing unit 300 to the MCU 510.

The controller 500 may stop an operation of the transfer belt 110, based on a time when a sensing signal is generated from the infrared sensor of the sensing unit 300 disposed in the works outlet.

For example, when it is determined that the sensing signal is not generated by the infrared sensor of the sensing unit 300 disposed in the works inlet, an instruction for inputting works may be performed.

An operation of the transfer belt 110 may stop, and then, a motor control signal of the controller 500 may be transferred to the variable jig module 200 under the transfer belt 110. Therefore, the support pin part 210 of the variable jig module 200 may be raised.

Referring to FIGS. 3 and 4, the variable jig module 200 may include a casing 202 and the support pin part 210. Here, the casing may include a plurality of pin entrances 201 provided in a top of the casing 202. The plurality of pin entrances 201 may communicate with the plurality of belt through holes 111, respectively. The support pin part 210 may be installed inside the casing 202, disposed in correspondence with each of the pin entrances 201, and provided in plurality.

In order to prevent interference from occurring between operations of the support pin parts 210, each of the support pin parts 210 may be manufactured in a small device structure. The support pin parts 210 may be disposed in the casing 202 of the variable jig module 200 so as not to cause interference therebetween.

The variable jig module 200 may include an extension shaft member 220 and a pinion gear 230. Here, the extension shaft member 220 may extend in a lengthwise direction of the support pin part 210 from a lower portion of the support pin part 210. A rack gear 221 may be provided in each of both side surfaces of the extension shaft member 220. The pinion gear 230 may engage with the rack gear 221. The pinion gear 230 may be rotatably supported to the casing 202.

The variable jig module 200 may include a driving device 550.

The driving device 550 may include a motor 551 and a shafting 552. Here, the motor 551 may operate according to the motor control signal of the controller 500. The shafting 552 may transfer a driving force of the motor 551 to the pinion gear 230.

For example, the driving device 550 may transfer a driving force for raising or lowering the support pin part 210 to the pinion gear 230 according to the motor control signal of the controller 500.

The shafting 552 of the driving device 550 may include a plurality of force transfer shafts and a rotation direction change gear (not shown).

Normal rotation directions or reverse rotation directions of a pair of pinon gears 230 may be synchronized with each other by the force transfer shaft and the rotation direction change gear. Normal rotations or reverse rotations of the pair of pinion gears 230 may be simultaneously performed, and thus, the rack gears 221 may be simultaneously raised or lowered.

The support pin parts 210 may each include a pressure sensor 211 and a hollow body 213. Here, the pressure sensor 211 may be installed in an upper end of the extension shaft member 220. The pressure sensor 211 may input a pressure measurement signal, generated based on a contact with works, to an element of the controller 500 (for example, the MCU 510 of the controller 500). The hollow body 213 may be coupled to the extension shaft member 220 to surround the pressure sensor 211. The hollow body 213 may extend to the pin entrance 201 of the casing 202. The hollow body 213 may include an upper hole 212 having a hole size which is relatively smaller than a flat area of the pressure sensor 211.

The hollow body 213 may be formed of a metal material capable of enduring a load of works and may guide or support an elastic member 214 such as a spring.

The elastic member 214, an element of the support pin part 210, may be located on a top of the pressure sensor 211 and may be disposed inside the hollow body 213.

A roller ball 215 may be disposed on the elastic member 214 and may be restrained by a border of the upper hole 212 of the hollow body 213. The roller ball 215 may passively rotate by a friction when contacting an object (for example, a bottom of the transfer belt, a bottom of each of works, or the like). The roller ball 215 may be a spherical body or a bearing ball.

A diameter of the roller ball 215 may be set relatively larger than the upper hole 212 of the hollow body 213.

The roller ball 215 may point-contact works. The roller ball 215 may move in a compression deformation direction of the elastic member 214 when point-contacting the works. The roller ball 215 may return to an original position when non-contacting the works.

The variable jig module 200 may further include a pin brake device 240. Here, the pin brake device 240 may be disposed close to the pinion gear 230 and may lock or release the pinion gear 230.

The pin brake device 240 may include a stop gear 241 and an actuator 242. Here, the stop gear 241 may have a ratchet shape so as to engage with the pinion gear 230. The actuator 242 may be coupled to a rotation shaft of the stop gear 241. The actuator 242 may rotate or reversely rotate the stop gear 241 according to a locking or releasing signal of the controller 500. For example, when the stop gear 241 rotates or reversely rotates, the stop gear 241 may contact the pinion gear 230 or may be separated from the pinion gear 230.

For example, if the pin brake device 240 is a rectilinear reciprocating cylinder, the stop gear 241 may directly contact the rack gear 221 or may be separated from the rack gear 221 through an application design or separate manufacturing.

The MCU 510 of the controller 500 may deliver a raising signal of the motor control signal to the motor 551, and thus, the support pin part 210 may be raised.

The raised support pin part 210 may contact a bottom or a surface of each of works through the pin entrance 201 and the belt through hole 111.

Sorting between the pin entrance 201 and the belt through hole 111 may be realized by an optical recognition device for recognizing a separate position sensor or a mark for hole sorting. To this end, the mark may be provided on a side surface of the transfer belt 110. The mark may be various types of identification means recognizable by the optical recognition device.

The roller ball 215 of the support pin part 210 may move works and may smoothly support the works with an elastic force of the elastic member 214.

When the support pin part 210 is raised, the elastic member 214 may support the roller ball 215 at a position under the roller ball 215 and may pressurize the pressure sensor 211 disposed under the elastic member 214.

The raised support pin part 210 may be raised by a height corresponding to a shape of a bottom of each of works or may be raised to contact the bottom or a surface of each of the works. At this time, a load delivered through the roller ball 215 and the elastic member 214 may be measured through the pressure sensor 211.

The pressure sensor 211 may be a sensor having a road cell type or a strain cage type. For example, if the pressure sensor 211 is the strain cage type, the pressure sensor 211 may be configured with a bridge circuit. An analog signal delivered through the pressure sensor 211 may be converted into a digital signal by the MCU 510. A threshold value for the pressure sensor 211 may be previously set in the MCU 510. Here, the threshold value may have diversity depending on a characteristic of the variable jig module 200 or works and may be set through a separate setting operation.

For example, in the present embodiment, when a load (i.e., a value of the pressure measurement signal) sensed by the pressure sensor 211 is greater than the threshold value, the raising of the support pin part 210 may stop.

As described above, the support pin part 210 may be raised or lowered by the extension shaft member 220 including the rack gear 221 and the pinion gear 230 for upward and downward moving the extension shaft member 220 and the rack gear 221.

Moreover, the stop or stop state of the support pin part 210 may be maintained by the above-described pin brake device 240.

The motor 551 may be provided in the variable jig module 200 by the number of the support pin parts 210. Each of the motors 551 may have an identifier which is recognizable in electric circuit, and the MCU 510 may control an operation of the motor 551 corresponding to each of the support pin parts 210 by using the identifier of each of the motors 551.

That is, the MCU 510 may check or determine a value of the pressure measurement signal generated by the pressure sensor 211 and may deliver the motor control signal to a corresponding motor 551.

The MCU 510 may deliver the locking signal or the releasing signal to the actuator 242, for the stop (for example, locking) or rotation (for example, releasing) of the pinion gear 230.

As a result, the pinion gear 230 may be put in a fixable or rotatable state, and thus, the vertical movement of the support pin part 210 may be controlled.

A series of commands or signals may be delivered from the MCU 510 to the PLC 520.

The PLC 520 may deliver the series of commands or signals to the PPC 530. As a result, the PPC 530 may display details, corresponding to the series of commands or signals, to a worker.

Moreover, the series of commands or signals may be transmitted to the MES 540, and data may be managed through the MES 540.

Hereinafter, a driving method of the conveyance apparatus including the variable jig according to the present embodiment will be described.

Figure 5A:
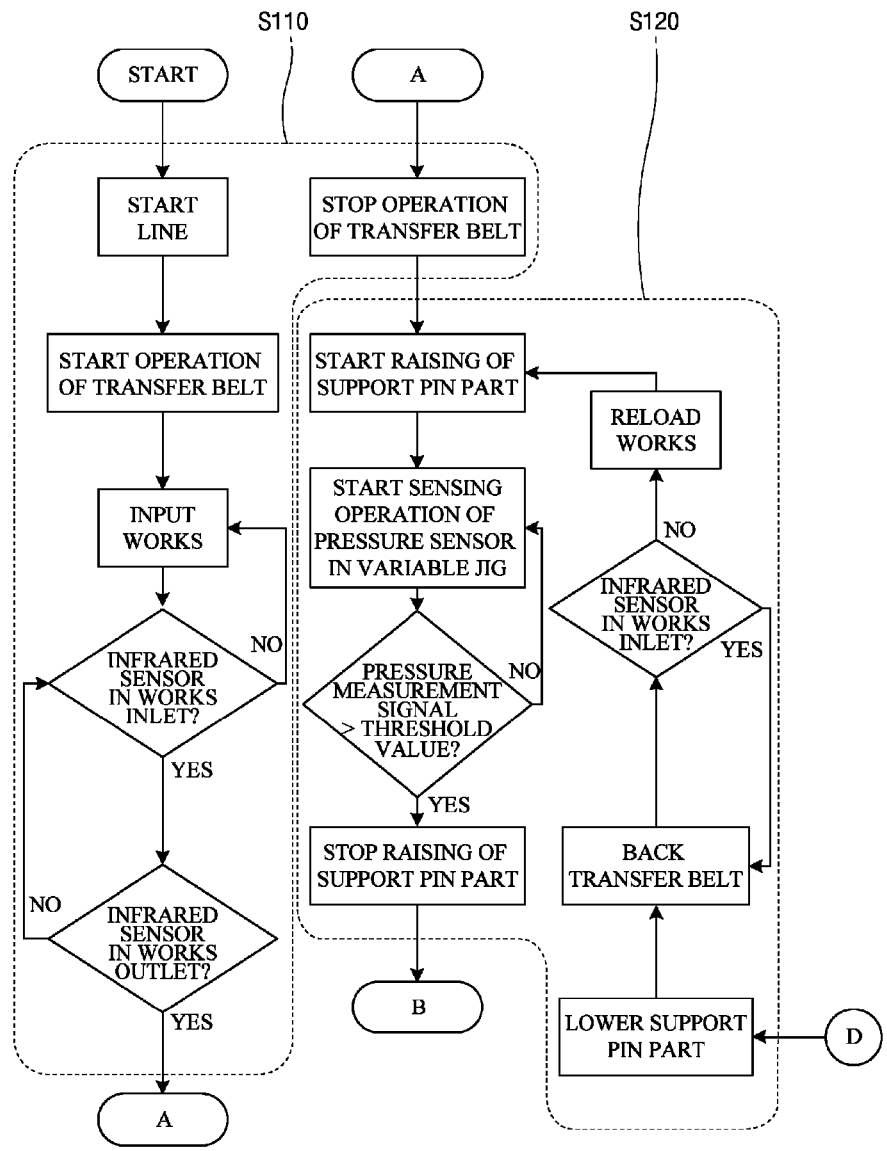
FIG. 5A and FIG. 5B are a flowchart for describing a driving method of the conveyance apparatus including the variable jig illustrated in FIG. 1.
Figure 5B:
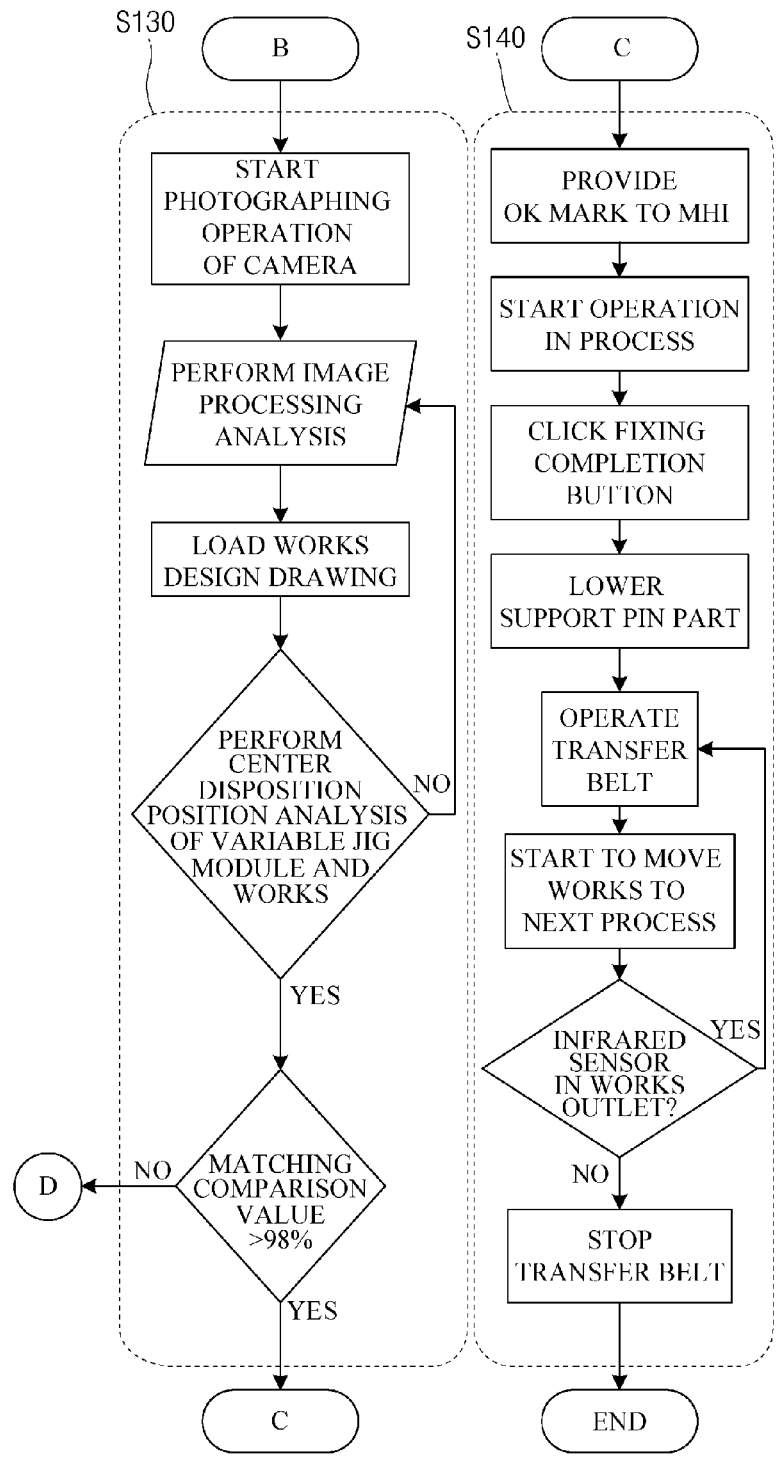

FIG. 5A and FIG. 5B are a flowchart for describing a driving method of the conveyance apparatus including the variable jig illustrated in FIG. 1.

Referring to FIG. 5A and FIG. 5B, the driving method of the conveyance apparatus including the variable jig may be performed by the above-described controller that is coupled to the transport unit transporting works and varies a supporting base and the variable jig module 200, based on shapes of the works.

The controller may perform a works input operation (S110) of moving or stopping the transfer belt of the transport unit to allow works to be located on the variable jig module.

In more detail, in the works input operation (S110), an operation of the transfer belt may start according to the start of a line, the works may be loaded onto the transfer belt, whether the infrared sensor disposed in the works inlet recognizes the works may be checked, and the operation of the transfer belt may stop at a time when the infrared sensor disposed in the works outlet recognizes the works. Here, the line may be a process system that re-transports the works after transport, assembly, or process.

Moreover, a jig varying operation (S120) may be performed by the controller.

In the jig varying operation (S120), when the transfer belt stops, an operation of the motor may be controlled by the variable jig module of the MCU, and thus, the plurality of support pin parts may start to be raised by a driving force of the motor. Also, the pressure sensor disposed inside the hollow body of the support pin part may generate the pressure measurement signal and may input the pressure measurement signal to the MCU.

Moreover, as the roller ball of the support pin part contacts a bottom of each of the works, the MCU of the controller may compare a threshold value with a value of the pressure measurement signal input from the pressure sensor of the support pin part to stop the raising of the support pin part.

Moreover, in a below-described image processing operation (S130), when the lowering of the variable jig (i.e., the lowering of the support pin part) needs through position matching comparison, the MCU may control the motor of each of the variable jig modules to lower a corresponding support pin part and back the transfer belt, and may check whether the infrared sensor disposed in the works inlet recognizes the works. Also, when necessary, reloading of the works may start.

The controller may perform the image processing operation (S130) for checking whether the works are located at a normal position.

In the image processing operation (S130), the image processing unit may photograph the works on the variable jig module to generate image information, and by using previously prepared design drawing information about the works and the image information, the image processing unit may matching-compare a position of the works on the variable jig module with a position included in the design drawing.

To provide an additional description, the camera of the image processing unit may photograph the works and may perform an image processing analysis on the works, and then, after a works design drawing is loaded, a position analysis on a center disposition of the variable jig module and the works may be performed. Also, when a matching comparison value obtained by comparing the position in the variable jig module 200 with the position included in the design drawing is greater than 98% which is a reference value, a process processing operation (S140) may be performed.

When the matching comparison value is less than 98%, the lowering of the support pin part in the jig varying operation (S120) may be performed.

Subsequently, the transfer belt may be backed until recognition of the works is not performed by the infrared sensor disposed in the works inlet, and the image processing operation (S130) may be repeated until the works are located at a normal position after the reloading of the works starts.

Moreover, the controller may perform the process processing operation (S140) of displaying a matching comparison result of the image processing operation (S130) through an HMI of the PPC.

In this case, in the process processing operation (S140), the controller may provide information (for example, OK mark), indicating that it is possible to perform an operation on the works, to the HMI. Subsequently, the operation on the works in a process may start according to the information displayed on the HMI, and then, when the operation on the works is completed, the controller may lower the support pin part according to a process completion button click signal input to the controller and may move (for example forward move) the transfer belt, thereby performing control in order for the works to be transferred to a next process. Even in this case, the transfer belt may operate or stop according to whether the infrared sensor disposed in the works outlet recognizes the works.

FIGS. 6 to 10 are diagrams for describing a step-based process corresponding to FIG. 5A and FIG. 5B.

Figure 6:
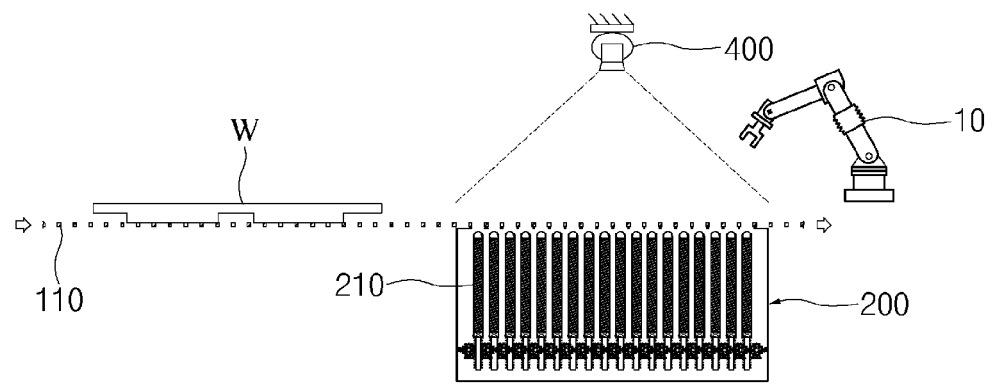
FIGS. 6 to 10 are diagrams for describing a step-based process corresponding to FIG. 5A and FIG. 5B.

Referring to FIG. 6, products (i.e., works W) may be loaded onto the transfer belt 110 (for example, a conveyor belt) of the transport unit.

Figure 7:
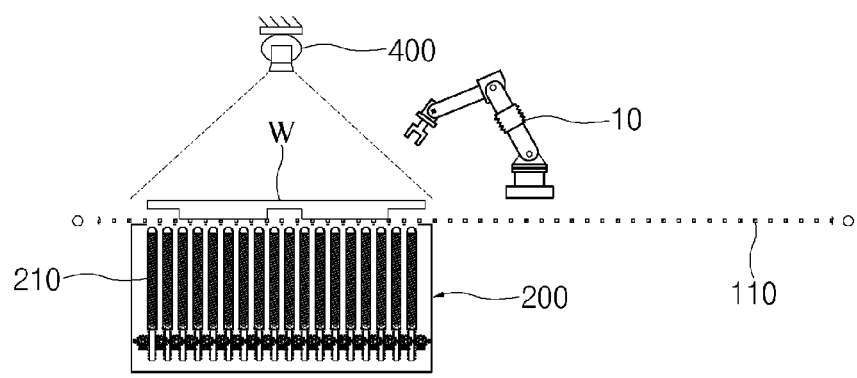

The works W may be transferred to a position on the variable jig module 200 and may be put in a state of FIG. 7. Since the transfer belt 110 stops according to whether the infrared sensor disposed in the works inlet and the infrared sensor disposed in the works outlet recognize the works W, the works may stop at a position on the variable jig module 200. Here, the works W may be door trims or may be products requiring various transport and assembly.

Figure 8:
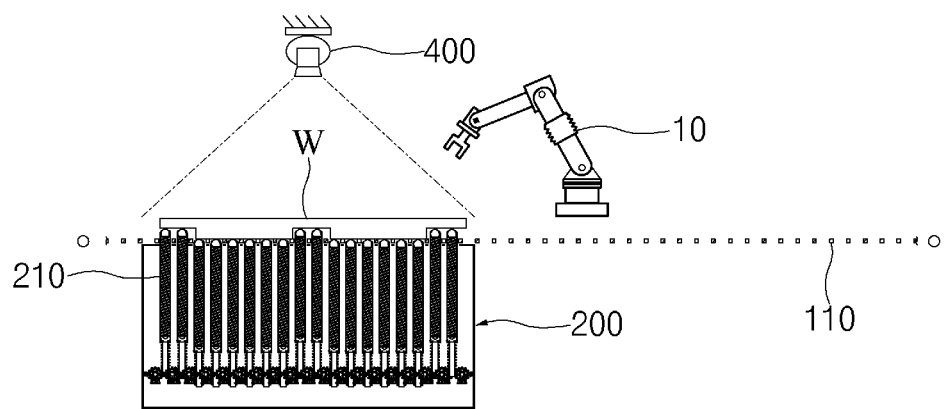

Referring to FIGS. 7 and 8, in the above-described driving method, the raising of the support pin parts 210 of the variable jig module 200 may start. The support pin part 210 may move to the works W via a pin outlet of the casing of the variable jig module 200 and the belt through hole of the transfer belt.

The moving distances or raising positions of the support pin parts 210 may be the same or differ based on a shape of a bottom or a surface of each of the works W, and thus, the support pin part 210 may support or maintain the works W, based on a three-dimensional structure of the works W.

Moreover, as illustrated in FIG. 8, when the raising of the support pin part 210 stops, the camera of the image processing unit 400 disposed on the variable jig module 200 may photograph the works W and may load a design drawing of a corresponding work W through image processing.

In this case, image processing where the works W are photographed by the camera and analyzed may be performed in an image analysis method (for example, an appearance image processing method) of analyzing the whole shapes of the works W and a barcode image analysis method using a barcode attached to or imprinted on the works W.

The appearance image processing method for the works W may use a method where the MCU of the controller stores appearance information and design information about products in a database (DB) and compares the stored information with an appearance to search for desired information.

Moreover, the barcode image analysis method may include time-serial operations such as barcode border search, barcode separation, barcode recognition, barcode extraction, barcode comparison, and barcode perception and processing.

A position analysis on a center disposition of the works W (products) and the variable jig module 200 which is a variable jig may be performed through the image processing, and a position in the variable jig module 200 and a position included in a design drawing may be matching-compared with each other. When a matching comparison value is equal to or more than 98%, an OK mark may be provided to the HMI.

Figure 9:
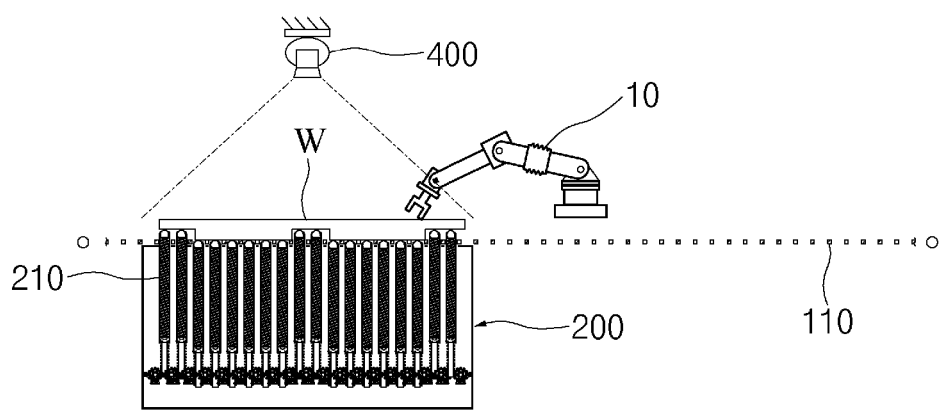

As in FIG. 9, "OK" may be displayed, and then, an operation of a robot 10 or a worker at a factory may start. A process may be performed on predetermined details, and then, when the worker clicks a process completion button through the HMI, a next process may be performed, whereby the works W may be put in a state of FIG. 10.

Figure 10:
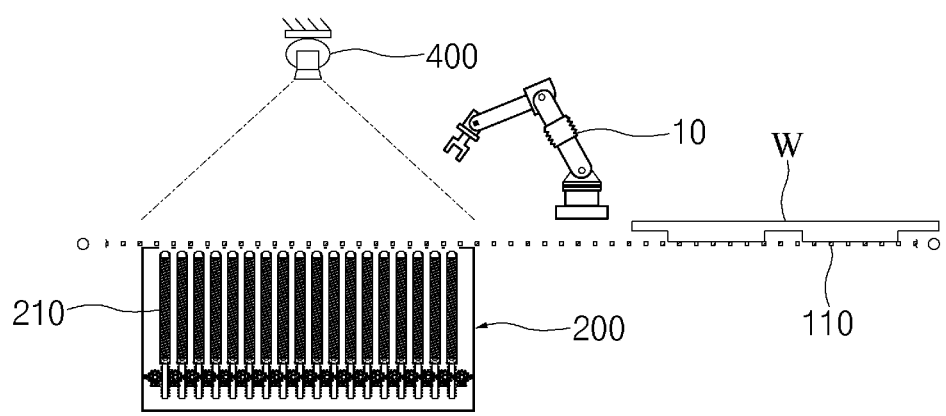

Referring to FIG. 10, when the process completion button is approved, the support pin part 210 of the variable jig module 200 may be lowered to a lowermost position, and thus, interference does not occur between the support pin part 210 and the belt through hole of the transfer belt 110. Subsequently, the transfer belt 110 may operate.

The works W may be transferred to a next process through the operation of the transfer belt 110. In this case, the transfer belt 110 may operate until there is no sensing signal which is generated when the infrared sensor disposed in the works outlet senses the works W, and then, may stop.

The transfer belt 110, as illustrated in FIG. 1, may operate while sequentially turning round like a pedrail or a conveyor belt, or may operate in a predetermined order. Also, a speed of the transfer belt 110 may be controlled by the controller according to an embodiment of the present invention. Also, in FIG. 1, only three variable jig modules 200 are connected or disposed, but in a case where the variable jig modules 200 are applied to an actual factory, several to tens of variable jig modules may be connected and used.

Moreover, the transfer belt 110 may be used by small divided units in proportion to the number of the variable jig modules 200.

Figure 11:
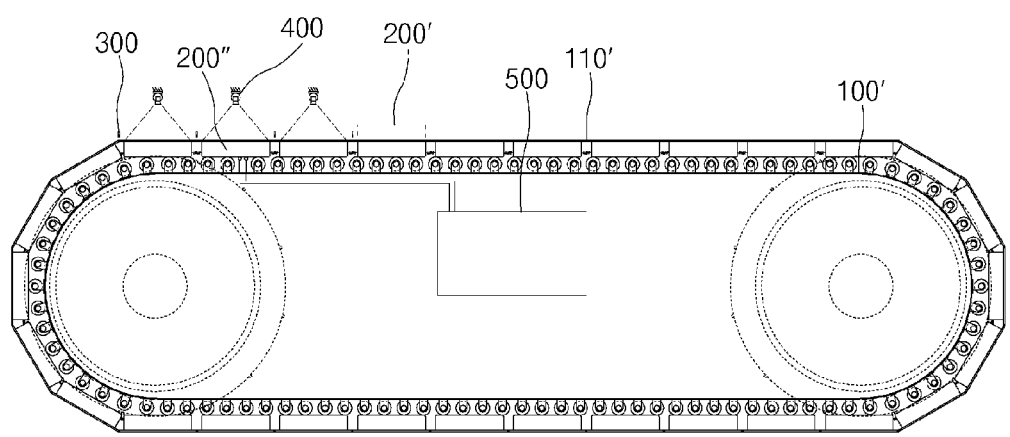
FIG. 11 is a front view for describing a configuration of a conveyance apparatus including a variable jig according to an application embodiment of the present invention.

FIG. 11 is a front view for describing a configuration of a conveyance apparatus including a variable jig according to an application embodiment of the present invention.

Referring to FIG. 11, as described above in detail, a variable jig module 200' (200") according to the application embodiment of the present invention may be installed on a bottom of a transfer belt 110' of a transport unit 100' or a top of the transfer belt 110'.

For example, a casing of the variable jig module 200' according to an aspect of the application embodiment may be fixed to the top of the transfer belt 110', and a casing of the variable jig module 200' according to another aspect of the application embodiment may be fixed to the bottom of the transfer belt 110'.

A casing of the variable jig module 200' (200") may move at a speed which is the same as that of the transfer belt 110'.

A communication line or a power line for the variable jig module 200' (200") may be configured with a contact electrode terminal. Therefore, a signal may be transmitted to a controller 500 through the communication line, and power may be supplied to the controller 500 through the power line.

The transport unit 100' according to the application embodiment may be configured to transport both the transfer belt 110' and the variable jig module 200' (200") along a movement path for works.

Moreover, a belt through hole of the transfer belt 110' and a pin entrance of the casing of the variable jig module 200' (200") may be matched with each other by the fixing, and a configuration of the variable jig module 200' (200") according to the application embodiment is relatively easily implemented.

Moreover, the variable jig module 200' (200") according to the application embodiment may move along with the transfer belt 110' and may support and fix works while the transfer belt 110' is moving, based on shapes of the works.

In the conveyance apparatus including the variable jig and the driving method thereof according to the embodiments of the present invention, since the conveyance apparatus includes the transport unit including the conveyor belt and the variable jig module coupled to the transport unit, the conveyance, stop, assembly, and sort of works may be systemically performed, and work efficiency is maximized.

Moreover, in the conveyance apparatus including the variable jig and the driving method thereof according to the embodiments of the present invention, jigs based on works having different standards or shapes may not be added into the conveyance apparatus or may not be manufactured.

Moreover, in the conveyance apparatus including the variable jig and the driving method thereof according to the embodiments of the present invention, in a case where the transport unit provides works to an upper position of the variable jig module by using the conveyor belt, the variable jig module may be modified to be suitable for the provided works and may become a supporting base of the provided works, the cost necessary for manufacturing conventional various jigs is reduced, and a jig replacement duration is shortened.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A conveyance apparatus including a variable jig, the conveyance apparatus comprising:
   a transport unit including a transfer belt extending from a loading position to an unloading position of works, the transport unit being a movement path for the works;
   a variable jig module disposed with respect to a position, where the works stop, in the movement path to support the works, the variable jig module being a variable jig that varies a supporting base, based on shapes of the works;
   a sensing unit disposed outside the transfer belt with respect to the variable jig module to measure a movement or position of the works;
   an image processing unit configured to perform image processing on the works transported by the transfer belt to generate image information; and
   a controller electrically connected to the variable jig module to control an operation of the variable jig module,
   wherein the controller controls an operation of a motor of the variable jig module to raise a plurality of support pin parts of the variable jig module with a driving force of the motor, and to stop the raising of the plurality of support pin parts according to a pressure measurement value of a pressure sensor of each of the plurality of support pin parts when each of the plurality of support pin parts contacts a bottom of the works, and
   wherein the controller checks whether the works are located at a predetermined position by matching-comparing a position of the works on the variable jig module with a position included in a design drawing by using the image information and previously prepared design drawing information about the works.

2. The conveyance apparatus of claim 1, wherein:
   the transport unit further comprises a belt driving device configured to move the transfer belt through the movement path, and
   a plurality of belt through holes, through which the plurality of support pin parts provided in the variable jig module pass, are provided in the transfer belt.

3. The conveyance apparatus of claim 1, wherein the variable jig module is disposed apart from a bottom of the transfer belt.

4. The conveyance apparatus of claim 1, wherein the variable jig module is installed on a bottom or a top of the transfer belt.

5. The conveyance apparatus of claim 2, wherein:
   the variable jig module comprises:
   a casing including a plurality of pin entrances respectively placed to correspond to the plurality of belt through holes, the plurality of pin entrances being provided in a top of the casing;
   the plurality of support pin parts installed inside the casing and disposed to respectively correspond to the plurality of pin entrances;
   an extension shaft member extending in a lengthwise direction of each of the plurality of support pin parts from a lower portion of a corresponding support pin part, a rack gear being provided in each of both side surfaces of the extension shaft member;
   a pinion gear engaging with the rack gear, the pinion gear being rotatably supported to the casing; and
   a driving device including a motor, configured to operate according to a motor control signal of the controller, and a shafting configured to deliver a driving force of the motor to the pinion gear, and
   the driving device delivers the driving force for raising or lowering the plurality of support pin parts to the pinion gear according to the motor control signal of the controller.

6. The conveyance apparatus of claim 5, wherein the plurality of support pin parts each comprise:
   the pressure sensor installed in an upper end of the extension shaft member to input a pressure measurement signal, generated based on a contact with the works, to the controller;
   a hollow body coupled to the extension shaft member to surround the pressure sensor, the hollow body extending to each of the plurality of pin entrances and including an upper hole having a hole size which is relatively smaller than a flat area of the pressure sensor;
   an elastic member located on a top of the pressure sensor and disposed inside the hollow body; and
   a roller ball disposed on the elastic member and restrained by a border of the upper hole of the hollow body.

7. The conveyance apparatus of claim 5, wherein the variable jig module further comprises a pin brake device disposed close to the pinion gear to lock or release the pinion gear.

8. The conveyance apparatus of claim 7, wherein the pin brake device comprises:

a stop gear provided in a ratchet shape to engage with the pinion gear; and an actuator coupled to a rotation shaft of the stop gear to rotate or reversely rotate the stop gear according to a locking or releasing signal of the controller to bring the stop gear in contact with the pinion gear or separate the stop gear from the pinon gear.

9. The conveyance apparatus of claim 6, wherein the controller comprises:

a micro-computer unit configured to receive a sensing signal of the sensing unit corresponding to the presence of loading or unloading of the works, an image processing signal delivered from the image processing unit, and a pressure measurement signal of the pressure sensor to control, the motor;

a programmable logic controller connected to the micro-computer unit to control movement or stop of the transfer belt of the transport unit in cooperation with the micro-computer unit, based on a process for the works;

a project planning controller connected to the programmable logic controller to plan and control a project associated with the process for the works and display an operation command or an operation situation of the transport unit or the variable jig module to a user; and a manufacturing execution system connected to the programmable logic controller to manage a signal or information processed by the programmable logic controller.

10. A driving method of a conveyance apparatus, including a variable jig and a controller coupled to a transport unit transporting works to vary a supporting base based on shapes of the works, the driving method comprising:

by the controller, moving or stopping a transfer belt of the transport unit to place the works on a variable jig module;

when the transfer belt stops, controlling an operation of a motor of the variable jig module to raise a plurality of support pin parts with a driving force of the motor, and when a roller ball of each of the plurality of support pin parts contacts a bottom of each of the works, comparing a threshold value with a value of a pressure measurement signal input from a pressure sensor of each of the plurality of support pin parts to stop the raising of the plurality of support pin parts;

photographing the works on the variable jig module by using an image processing unit to generate image information, and matching-comparing a position of the works on the variable jig module with a position included in a design drawing by using previously prepared design drawing information about the works and the image information; and displaying a result of the matching comparison on, a human machine interface of a project planning controller.

11. The driving method of claim 10, wherein the displaying comprises, by the controller, starting a process on the works according to information displayed on the human machine interface, lowering the plurality of support pin parts according to a process completion button click signal which is input to the controller when the process on the works is completed, and moving the transfer belt, thereby performing control to transport the works to a next process.

* * * * *